US012716535B2

(12) United States Patent
Frederiksen

(10) Patent No.: US 12,716,535 B2
(45) Date of Patent: Aug. 25, 2026

(54) CONNECTOR WITH GUIDING COMPONENTS

(71) Applicant: COOPER-STANDARD AUTOMOTIVE INC, Northville, MI (US)

(72) Inventor: Stephen S. Frederiksen, Clarkston, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 90 days.

(21) Appl. No.: 17/988,027

(22) Filed: Nov. 16, 2022

(65) Prior Publication Data

US 2024/0159340 A1 May 16, 2024

(51) Int. Cl.
*F16L 37/14* (2006.01)
*F16L 37/084* (2006.01)
*F16L 37/12* (2006.01)

(52) U.S. Cl.
CPC ......... *F16L 37/144* (2013.01); *F16L 37/0841* (2013.01); *F16L 37/1225* (2013.01); *F16L 2201/10* (2013.01)

(58) Field of Classification Search
CPC . F16L 2201/10; F16L 37/144; F16L 37/0841; F16L 37/1225
See application file for complete search history.

(56) References Cited

U.S. PATENT DOCUMENTS 3,314,696 A * 4/1967 Ferguson ............. F16L 37/144 285/305
8,251,407 B2 8/2012 Tiberghien et al.
9,377,145 B2 6/2016 Cruickshank et al.
11,149,888 B2 * 10/2021 Delorme ............. F16L 37/0841
2004/0178629 A1 * 9/2004 Yoshida .............. F16L 37/0841 285/305
2005/0136741 A1 * 6/2005 Yoshida ................ F16L 37/144 439/347
2006/0066100 A1 * 3/2006 Nakashima ........... F16L 37/144 285/305
2007/0059972 A1 * 3/2007 Rigollet ................ F16L 37/144 439/441

(Continued)

FOREIGN PATENT DOCUMENTS

DE 202020103903 U1 * 8/2020 .......... F16L 37/1225
EP 4008946 A1 6/2022
WO WO-2018104616 A1 * 6/2018 ............ F16L 37/144

OTHER PUBLICATIONS

Search Report and Written Opinion for 23209988.7 dated Mar. 26, 2024.

*Primary Examiner* — Matthew Troutman
*Assistant Examiner* — Fannie Kee
(74) *Attorney, Agent, or Firm* — Paschall & Associates, LLC; James C. Paschall; Anthony Miologos

(57) ABSTRACT

A connector and a process for coupling a tube to another device is disclosed. The connector comprises a receptacle for receiving an endform formed on an end of the tube. The receptacle includes a socket mated to a modular head. A retainer embraces the receptacle and has leg portions extending into a modular head opening. Guiding components located in the modular head opening and on the endform direct the endform through the modular head opening to the socket and into a locking relationship with the retainer.

14 Claims, 5 Drawing Sheets

(56) References Cited

U.S. PATENT DOCUMENTS

| | | | | |
|---|---|---|---|---|
| 2008/0252070 | A1* | 10/2008 | Hartmann | F16L 37/144 285/147.3 |
| 2012/0056420 | A1* | 3/2012 | Fansler | F16L 37/144 285/308 |
| 2015/0176738 | A1* | 6/2015 | Nezu | F16L 37/0841 285/321 |
| 2015/0233510 | A1* | 8/2015 | Nezu | F16L 37/144 285/247 |
| 2017/0227153 | A1* | 8/2017 | Nezu | F16L 37/1225 |
| 2019/0293102 | A1* | 9/2019 | Nezu | F16L 37/0841 |
| 2019/0390808 | A1* | 12/2019 | Trotter | F16L 37/144 |
| 2020/0056730 | A1* | 2/2020 | Kimura | F16L 37/1225 |
| 2020/0072399 | A1* | 3/2020 | Gaudiau | F16L 37/144 |
| 2020/0166167 | A1* | 5/2020 | Hagen | F16L 37/0841 |
| 2020/0309298 | A1* | 10/2020 | Kuhn | F16L 37/0841 |
| 2021/0054957 | A1* | 2/2021 | Gocha | F16L 37/0841 |
| 2021/0332923 | A1 | 10/2021 | Han et al. | |
| 2022/0178481 | A1* | 6/2022 | Gocha | F16L 37/144 |
| 2023/0096609 | A1* | 3/2023 | Frederiksen | F16L 37/144 137/561 R |

* cited by examiner

CONNECTOR WITH GUIDING COMPONENTS

TECHNICAL FIELD

This disclosure relates to a connector for coupling a tube to a device. More particularly, this disclosure relates to a fluid connector having a mounted retainer and guiding components for guiding and capturing an endform of a tube.

BACKGROUND in fluid piping in which a tube, such as a pipe or a hose, is joined to another device such as a pump, tank or another tube, a fluid connector may be used for joining the tube to the other device such as for example a quick connect/quick disconnect fluid connector. In the automotive industries quick connect fluid connectors are used to provide connection between two components, conduits and between components and conduits, such as hoses and the like. The quick connect fluid connector typically provides a coupling between a male tube that is received in a tubular receptacle. The male tube may include an endform for snap engagement of the tube with the receptacle that provides a locking relation between them. The tubular receptacle can be formed from plastic or metal, as appropriate for the specific application. A seal ring located between an inner periphery of a socket of the receptacle and an outer periphery of the endform provides a fluid-tight seal that prevents leaking when the endform is coupled to the receptacle.

Currently known quick connect fluid connectors are relatively complicated to assemble or disassemble causing connection errors or failure-prone connections. A further disadvantage of the known fluid connectors is that the retainer may be completely separated from the connector in particular when in a non-engaged position, and thus represents a component that may be lost. Additionally, known connectors are not provided with guiding components for properly guiding the endform into the locking relation with the receptacle and the retainer.

It would be desirable to provide an improved fluid connector which has a minimal number of separate components.

It would also be desirable to provide an improved fluid connector having guiding components for properly orienting an endform into a locking relation with a receptacle of the connector.

SUMMARY

A connector and a process for coupling a tube to another device is disclosed. The connector comprises a receptacle for receiving an endform formed on an end of the tube. The receptacle includes a socket mated to a modular head. A retainer embraces the receptacle and has first and second legs with portions of the first and second legs extending through a respective window into an opening in the modular head. Guiding components located in the modular head opening and on an the endform direct the endform through the modular head opening to the socket and into a locking relationship with the retainer.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
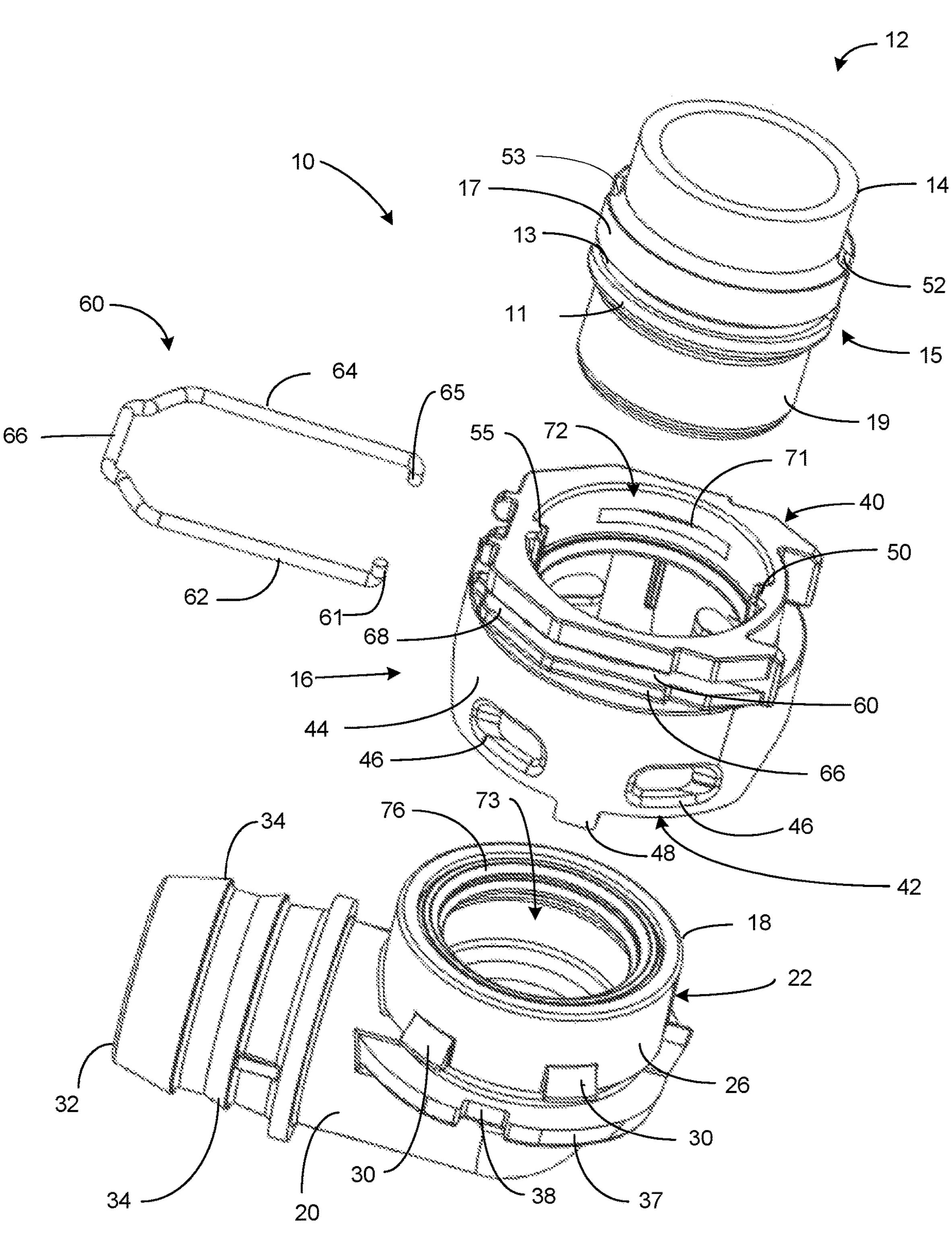
FIG. 1 is an exploded isometric view of a disassembled connector and tube of the present disclosure.
Figure 2:
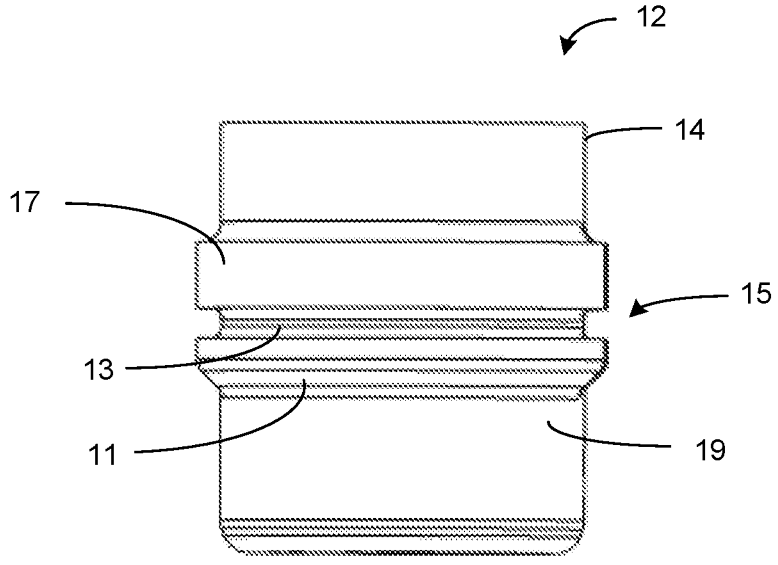
FIG. 2 is an elevational view of the endform of the present disclosure.
Figure 3:
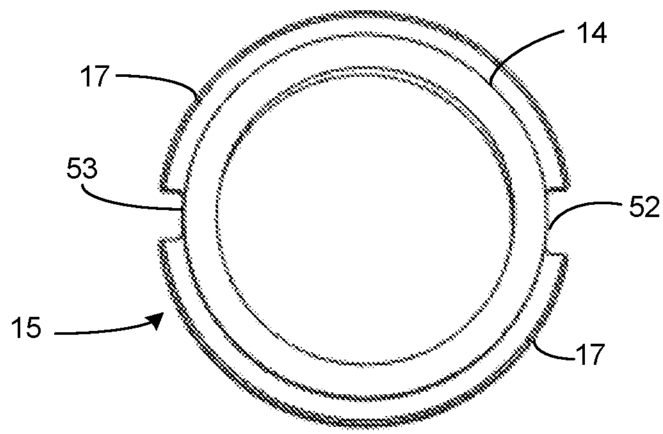
FIG. 3 is a top plan view of endform of FIG. 2 of the present disclosure.

FIG. 1 illustrates an exploded view of an example fluid connector 10 for coupling a tube 12 to another device. The other device may be another tube, or it could be a tank or a pump, for example. The tube 12 is partially shown in FIG. 1 and includes an endform 14 secured on an end of the tube 12. The tube 12 may be a hose, or a pipe, that fluidically communicates with another device. The example fluid connector 10 may be tubular defining a hollow passage through which a fluid may pass to or from the tube 12. In an aspect, the fluid connector 10 may have an annular configuration made up of generally hollow cylindrical segments. The endform 14 includes an annular lower portion surface 19, a raised upset 15 located parallel to the bisected by first and second slots 52 and 53 located equidistant on opposite sides of the endform 14. The raised upset segment 15 is comprised of an annular ramp member 11 extending obliquely from the lower portion surface 19, a raised annular ring member 17 and a groove 13 located between the ramp member 11 and the ring member 17.

The fluid connector 10 comprises a receptacle 16 for receiving the endform 14 of the tube 12. The receptacle 16 may comprise of two separate pieces. The first piece of the receptacle 16 is a socket 22. The socket 22 has a female end 18 and a coupling end 20. The female end 18 of the socket 22 receives the lower portion 19 end of the endform 14 within a socket opening 73. The socket 22 includes an annular outer wall 26 surrounding the female end 18.

A latch 30 may be fashioned on the outer wall 26. In an aspect, a plurality of latches 30 may be fashioned on the outer wall 26 of the female end 18. The latches may be rectangular and include a chamfered surface that extends obliquely outward from outer wall 26. An annular brim 37 extends about the lower periphery of outer wall 26 below latches 30. The brim 37 further includes a locating notch 38 extending partially into brim 37. A second locating notch 38 (not shown) may be formed on brim 37 on an opposite side of the socket 22.

The coupling end 20 is used to couple the connector 10 to another device. The coupling end 20 may include a male stem 32 for mating with a receptacle of another device. The male stem 32 may include one or more barbed flanges 34 that can be friction fitted into another tube, for example, to couple the connector 10 to the other tube. In this embodiment, fluid from the tube 12 can pass from the tube through the female end 18 of the socket 22 and through the male stem 32 of the coupling end 20 of the connector 10 and into the other tube installed over stem 32 or vice-versa. The coupling end 20 may extend at any convenient angle applicable to the intended use of receptacle 16, which means that the coupling end 20 can have a feature, where the male stem 32, can have a longitudinal axis that may extend from the axis of the female end 18 obliquely or acutely, defining an angle between coupling end 20 and female end 18 that is not equal to 180 degrees.

The second piece of the receptacle 16 is a modular head 40. The modular head 40 has a mating end 42 located at a lower portion of modular head 40 that has an annular outer wall 44 extending about the periphery of modular head. Openings 46 extends through the outer wall 44 along the mating end 42. Additionally, the outer wall 44 includes a locating projection 48 adapted to be received by a locating notch 38 when the modular head 40 is installed on socket 22. A second locating projection (not shown) may extend from wall 44 on a side opposite of the locating projection 48 shown and similarly arranged to be received an associated locating notch 38 therein.

The modular head 40 mates with the socket 22 to provide the receptacle 16. The mating end 42 of the modular head 40 is arranged to be inserted over the outer wall 26 of the socket 22. The mating of the modular head 40 to socket 22 is made by aligning a locating projection 48 with an associated locating notch 38 and the modular head forced downward toward brim 37 to allow the chamfered portions of latches 30 to ride against the inside surface of the wall 44 until they are received within an associated opening 46, creating a snap-fit mechanical connection between the modular head 40 and socket 22. The mating end 42 of modular head 40 rests on brim 37 when the modular head 40 is fully inserted on socket 22 as can be best seen at FIG. 5. The socket 22 and the modular head 40 may be separately molded of a thermoplastic material such as polyamide or polyphthalamide.

FIGS. 1-4, illustrate an example of the guiding components of the present disclosure. The guiding components include ribs 50 and 55 located on modular head 40 and slots 52 and 53 on the endform 14. A second vertically oriented rib 55 extends into modular head opening 72 of modular head 40 from an opposite side of the opening 72 from first rib 50. The first rib 50 is arranged to be received within a first slot 52 located on endform 14. Similarly, the second rib 55 is arranged to be received within a second slot 55 of the endform 14. The first and second ribs 50, 55 and first and second slots 52 and 53 form the guiding components that index and align the endform 14 when the endform is installed into receptacle 16. With the ribs 50, 55 installed in their associated slots 52, 53 respectively. unwanted rotation of the endform 14 within modular head opening 72 is prevented when the endform 14 is installed in receptacle 16. To further provide proper orientation of endform 14 to the receptacle 16, each rib 50, 55 has a width that is dissimilar to the other and can only be accepted within a complimentary slot 52, 53. For example, rib 55 has a width that is smaller than the width of rib 50. Similarly, slot 53 has a width smaller than slot 52, allowing the endform 14 to be installed into opening 72 in only one orientation with rib 55 accepted only in slot 53 and rib 50 accepted only within slot 52.

Figure 4:
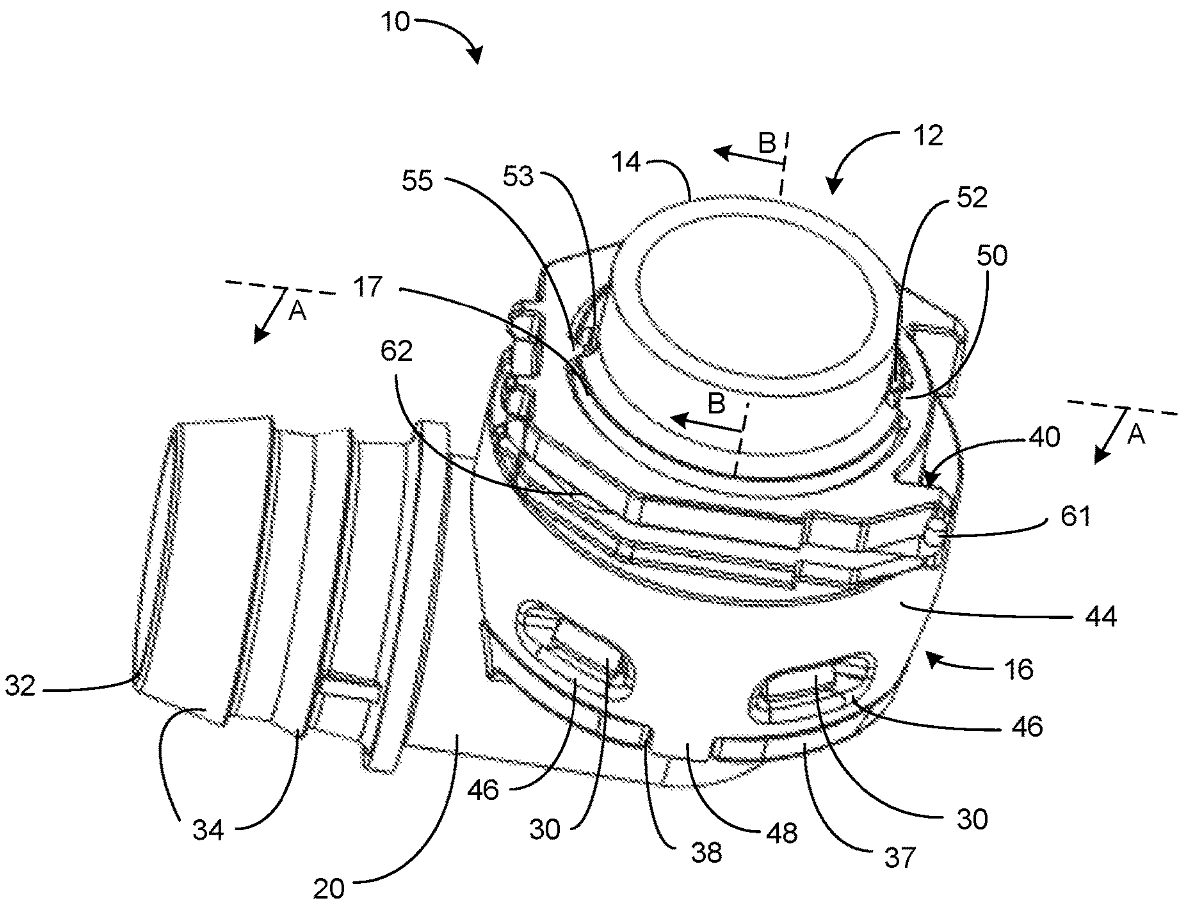
FIG. 4 is an isometric view of the assembled connector of the present disclosure.

As illustrated in FIG. 1, and FIG. 4, the connector 10 includes a wire retainer 60 arranged to be installed on modular head 40. The wire retainer 60 has a u-shaped configuration comprising two opposed legs 62, 64 extending from a bight 66. The wire retainer 60 is retained on the modular head 40 when mated to the socket 22 but could be retained directly on the modular head 40 even when the modular head 40 is not installed on the socket 22. The wire retainer 60 may be made of steel. The bight 66 embraces an outer wall 68 of the modular head 40, however legs 62, 64 extend through a window 71 in wall 68, permitting the legs to extend into modular head opening 72 of the modular head 40 when the wire retainer 60 is in a relaxed condition. Each leg 62, 64 terminates in an upturned prong 61, 65 which is assembled onto the modular head 40 by passing through a slot contiguous and orthogonal to the slots in wall 68.

Figure 5:
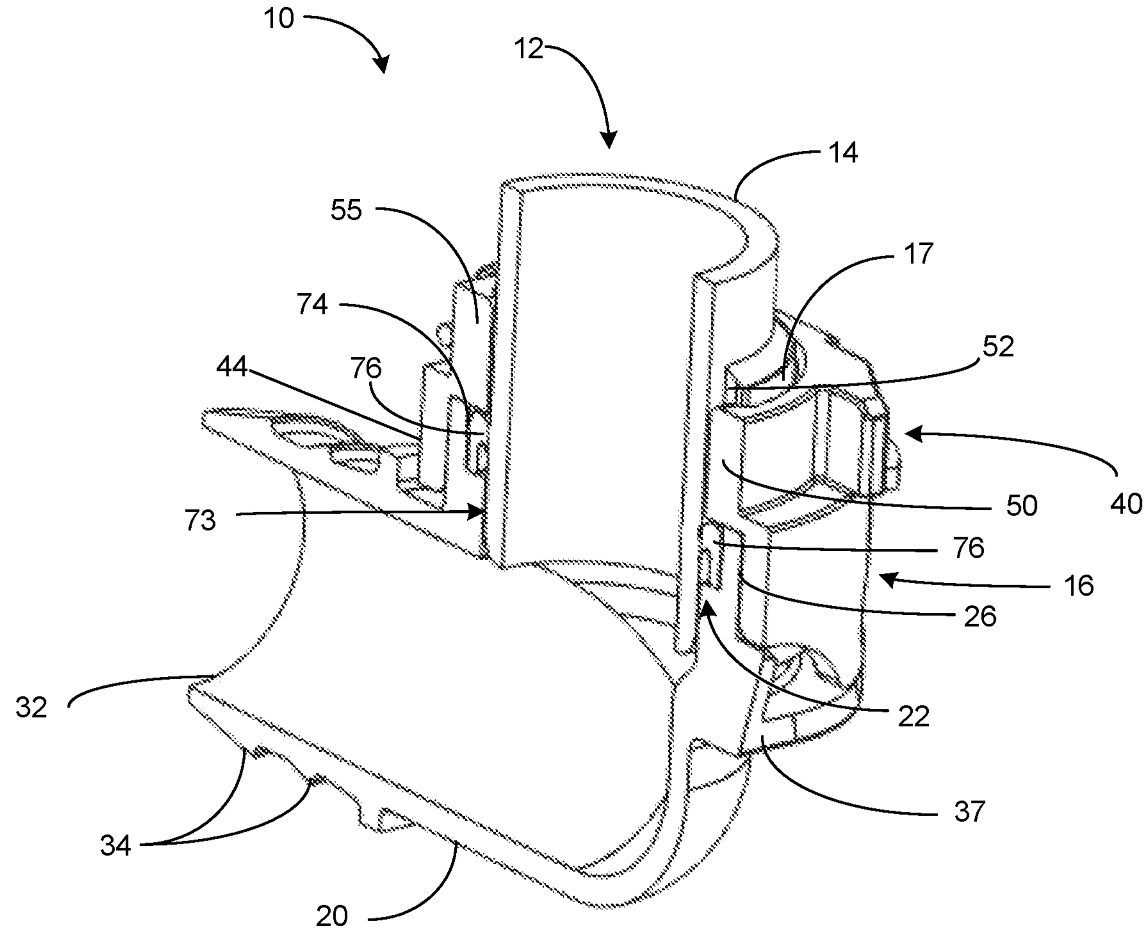
FIG. 5 is an isometric sectional view taken along line A-A of FIG. 4 of the present disclosure.
Figure 6:
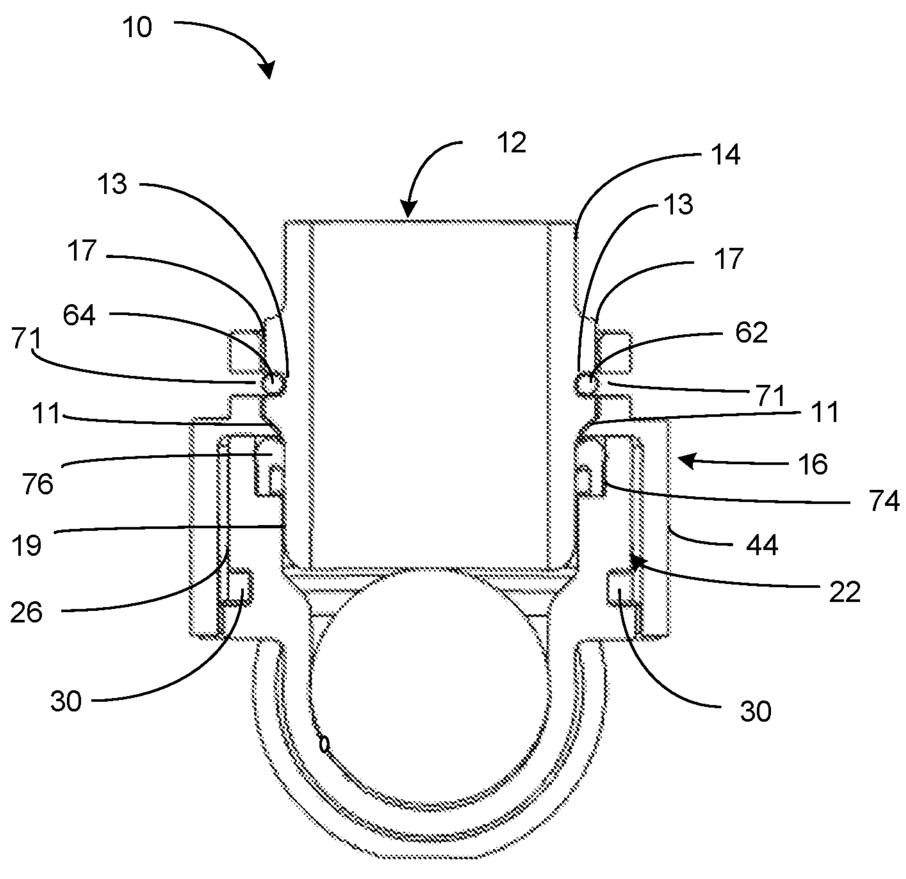
FIG. 6 is sectional plan view along taken along line B-B of FIG. 4 of the present disclosure.

As illustrated in the isometric sectional view of FIG. 5, an interior annular groove 74 is located within socket 22 of receptacle 16. The annular groove 74 is located about an interior surface of the socket 22 and is arranged to retain within the groove 74 an elastomeric sealing assembly 76, such as for example an O-ring. As shown in FIG. 5, the endform 14 when installed into receptacle 16, the lower portion 19 of the endform 14 enters socket opening 73 of socket 22, where the sealing assembly 76 squeezes around the surface of lower portion 19 preventing leakage of fluid around the exterior surface of the endform 14.

As illustrated in FIG. 1, and FIG. 4, the connector 10 includes a wire retainer 60 arranged to be installed on modular head 40. The wire retainer 60 has a u-shaped configuration comprising two opposed legs 62, 64 extending from a bight 66. The wire retainer 60 is retained on the modular head 40 when mated to the socket 22 but could be retained directly on the modular head 40 even when the modular head 40 is not installed on the socket 22. The wire retainer 60 may be made of steel. The bight 66 embraces an outer wall 68 of the modular head 40, however legs 62, 64 extend through a window 71 in wall 68, permitting the legs to extend into modular head opening 72 of the modular head 40 when the wire retainer 60 is in a relaxed condition. Each leg 62, 64 terminates in an upturned prong 61 which is assembled onto the modular head 40 by passing through a slot contiguous and orthogonal to the slots in wall 68.

As the endform 14 continues to be urged downward towards socket 22 and its final resting position, the ramp member 11 of endform 14 encounters legs 62 and 64 of the wire retainer 60. Further downward travel of the endform 14 causes the ramp member 11 to push each leg 62 and 64 out of a respective window 71, and out of the way of the endform 14 clearing the endform 14 to continue its downward travel. As the endform 14 reaches the socket 22 and its final resting position, the ramp member 11 stops pushing legs 62 and 64, allowing the legs to assume their relaxed positions and to snap-back through an associated window 71 and into groove 13 of the endform 14. Legs 62, 64 of the wire retainer 60 in their relaxed condition locate within groove 13 capturing the endform 14 in the receptacle 16. As explained above, with the endform 14 installed in receptacle 16 in its final resting position, the sealing assembly 76 squeezes around the surface of lower portion 19 sealing the exterior of the endform 14 from fluid flowing in connector 10.

It may be advantageous to set forth definitions of certain words and phrases used throughout this patent document. The term “communicate,” as well as derivatives thereof, encompasses both direct and indirect communication. The terms “include” and “comprise,” as well as derivatives thereof, mean inclusion without limitation. The term “or” is inclusive, meaning and/or. The phrase “associated with,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A connector for coupling a tube comprising:

a receptacle for receiving the tube, the receptacle including a socket having an opening and an annular brim extending about a periphery of the socket and at least one locating notch extending into the brim;

a modular head with an opening mated to the socket opening, wherein the modular head includes a lower portion defined by an annular wall that has at least one locating projection that is arranged to be received in the at least one locating notch when the modular head is mated to the socket;

a retainer embracing the receptacle, the retainer having first and second legs having portions of the first and second legs extending through a respective window into the modular head;

an endform formed on the tube having a raised upset comprised of a ring member and a ramp member and a groove located between the ramp member and the ring member; and guiding components including a first rib having a first width and a second rib having a second width, the second width unequal to the first width located in the modular head and extending to the socket opening from the modular head opening and a first slot complementary in width to the first width of the first rib and a second slot complementary in width to the second width of the second rib formed on the endform, wherein each of the first and the second slots extends transversely through the ring member and the ramp member and bisect the groove and wherein the guiding components cooperate to direct the endform from the modular head opening to the socket opening and into a locking relationship with the retainer.

2. The connector of claim 1, wherein the socket and modular head are separate pieces before being mated together.

3. The connector of claim 2, further comprising a latch on the socket and an opening on the modular head and wherein the latch is configured to fit in the opening when the socket is mated to the modular head.

4. The connector of claim 3, further comprising a plurality of latches spaced from each other on the socket and the modular head includes a plurality of openings, wherein each one of the plurality of latches is configured to fit in a respective opening when the socket is mated to the modular head.

5. The connector of claim 1, wherein the first rib is arranged to be accepted within the first slot and the second rib is arranged to be accepted into the second slot, wherein the first and second ribs and the first and second slots cooperate to guide the endform in only one orientation to the socket opening when the endform is installed into the modular head opening.

6. The connector of claim 5, wherein the groove is located about a periphery of the endform upset arranged to lockingly accept the first and second legs of the retainer locking the tube to the receptacle when the endform is located in the socket.

7. The connector of claim 6, wherein the socket includes an interior annular groove located circumferentially about the socket opening and an annular sealing assembly installed in the socket groove, the sealing assembly sealing against the endform when the endform is located in the socket.

8. A process for coupling a tube to a receptacle, the tube including an endform having a raised upset comprised of a ring member and a ramp member and a groove located between the ramp member and the ring member and first and second slots, each slot extending transversely through the ring member and the ramp member and bisecting the groove and the receptacle including a socket with an opening and an annular brim extending about a periphery of the socket having at least one locating notch extending into the brim, and a modular head having a first rib of a first width and a second rib of a second width, the second width unequal to the first width, the first and second ribs extending into the modular head from a modular head opening the modular head further including at least one locating projection extending from a lower portion of the modular head, the process comprising:

mating the socket with the modular head and installing the at least one locating projection into the at least one locating notch, positioning the first and second ribs to extend to the socket opening from the modular head opening;

inserting the endform and the first and second slots into the modular head opening, the first slot complementary in width to the first width of the first rib and the second slot complementary in width to the second width of the second rib, the first rib cooperating with the first slot and the second rib cooperating with the second slot to guide the endform through the modular head to the socket opening; and clipping a retainer in the groove on the endform when the endform is located in the socket to retain the tube to the receptacle.

9. The process of claim 8, wherein the mating step comprises mating a latch on the socket with an opening on the modular head.

10. The process of claim 9, wherein the mating step comprises mating a plurality of latches on the socket with a plurality of openings on the modular head.

11. The process of claim 8, wherein the process further includes installing a retainer having at least one leg to an exterior of the modular head, with a portion of the at least one leg extending through a window into the modular head.

12. The process of claim 11, wherein clipping the retainer comprises moving at least one retainer leg out of a window by the ramp member as the endform is moved to the socket, the at least one leg reentering the window when the endform groove aligns with the window and the endform locates in the socket allowing the at least one leg to enter the groove to retain the endform to the receptacle.

13. The process of claim 12, further comprising inserting the endform into a sealing assembly retained in the socket.

14. The process of claim 8, wherein the first rib cooperates only with the first slot and the second rib cooperates only with the second slot, enabling the installation of the endform into the modular head in only one orientation.

* * * * *